(12) United States Patent
Hsu

(10) Patent No.: US 12,527,685 B2
(45) Date of Patent: Jan. 20, 2026

(54) MANDIBLE ADJUSTMENT DEVICE

(71) Applicant: Han-Chung Hsu, Taipei (TW)

(72) Inventor: Han-Chung Hsu, Taipei (TW)

( * ) Notice: Subject to any disclaimer, the term of this patent is extended or adjusted under 35 U.S.C. 154(b) by 385 days.

(21) Appl. No.: 18/016,966

(22) PCT Filed: Aug. 7, 2020

(86) PCT No.: PCT/CN2020/107797
§ 371 (c)(1),
(2) Date: Jan. 19, 2023

(87) PCT Pub. No.: WO2022/027583
PCT Pub. Date: Feb. 10, 2022

(65) Prior Publication Data
US 2023/0285181 A1    Sep. 14, 2023

(51) Int. Cl.
*A61F 5/56* (2006.01)

(52) U.S. Cl.
CPC .................... *A61F 5/566* (2013.01)

(58) Field of Classification Search
CPC ........... A61F 5/56–566; A61C 7/00–36; A63B 71/08–10
See application file for complete search history.

(56) References Cited

U.S. PATENT DOCUMENTS

| | | | |
|---|---|---|---|
| 4,063,552 A * | 12/1977 | Going | A63B 71/085 128/861 |
| 6,418,933 B1 * | 7/2002 | Strong | A61F 5/566 128/859 |
| 6,450,167 B1 * | 9/2002 | David | A61C 7/08 128/859 |
| 8,316,857 B2 | 11/2012 | Thornton | |
| 10,363,160 B2 | 7/2019 | Baratier et al. | |
| 10,660,783 B2 | 5/2020 | Hofmann | |
| 2007/0224567 A1 | 9/2007 | Robson | |
| 2015/0305919 A1 | 10/2015 | Stubbs et al. | |

(Continued)

FOREIGN PATENT DOCUMENTS

| | | |
|---|---|---|
| CN | 106420147 A | 2/2017 |
| CN | 206285181 U | 6/2017 |
| CN | 208447894 U | 2/2019 |

(Continued)

*Primary Examiner* — Michelle J Lee
(74) *Attorney, Agent, or Firm* — LANWAY IPR SERVICES; Chun-Ming Shih

(57) ABSTRACT

A mandible adjustment device comprises an upper teeth brace and a lower teeth brace wherein the upper teeth brace and the lower teeth brace have an upper teeth accommodation space and a lower teeth accommodation space, respectively: the upper teeth accommodation space and the lower teeth accommodation space are developed according to a user's dental pattern for matching a human being's maxillary dental arch and mandible dental arch, respectively; the upper teeth brace and the lower teeth brace laterally extend a mucosa protection device opposite to an upper molar area and a positioning part opposite to a lower molar area, respectively. The upper teeth brace and the lower teeth brace, both of which have been installed, drive the positioning part and the mucosa protection device to combine each other and keep a flexible displacement space for neither discomfort at a condyle of the mandible.

6 Claims, 16 Drawing Sheets

(56) References Cited

U.S. PATENT DOCUMENTS

2018/0140385 A1* 5/2018 Jasper ................ A61C 7/36

FOREIGN PATENT DOCUMENTS

| EP | 3216430 A1 | 9/2017 |
| NZ | 577296 A | 4/2011 |
| WO | 2016149742 A1 | 9/2016 |
| WO | 2017173485 A1 | 10/2017 |

* cited by examiner

MANDIBLE ADJUSTMENT DEVICE

BACKGROUND OF THE INVENTION

1. Field of the Invention

The present invention relates to a mandible adjustment device, particularly a device capable of positioning a human being's mandible forward to keep a smooth breathing passage for neither respiratory arrest nor snore in sleep and relying on a mucosa protection device for no oral mucosal trauma.

2. Description of Related Art

The phenomena such as snore and respiratory arrest blamed to muscular relaxation mostly are bothering many people in sleep. For that matter, muscles of the supporting soft palate 102 and the tongue base 7 inside the oral cavity 101 of the mouth 10, as shown in FIG. 1, further droop under the action of gravity, squeezing the breathing passage 8 and causing a blocked airway that results in snore and even momentary cessation of breathing and asthma which are serious symptoms of sleep apnea that worsens sleep effect and induces high blood pressure, heart disease, etc.

For relieves of above symptoms, there have been so-called anti-snoring devices or snore stoppers commercially available. Most existing anti-snoring devices rely on upper and lower braces to combine a connecting mechanism with which a mandible is shifted forward to prevent the jaw from drooping and blocking the breathing passage 8.

However, each existing product mentioned hereinbefore is characteristic of a fixing mechanism with which upper and lower braces are immobilized and the mandible is forced to move forward and be fixed but fails to move back. A user who has installed an anti-snoring device for a long time might suffer from muscular soreness at the condyle of mandible and be intolerant to an anti-snoring device that bothers a user coming down with respiratory arrest.

In addition, most existing anti-snoring devices are off-the-shelf products with given specifications not exactly fitting with the shape of a user's dentition. As such, there will be any gap between a brace and teeth and even a position offset that leads to separation of a brace from teeth and makes no contribution to the effect of avoiding snore or respiratory arrest.

Furthermore, an existing anti-snoring device, which is manufactured as braces, is installed around two rows of dentitions of upper and lower jaws. However, a user who is moving the mandible forward and occluding teeth feels exists of foreign objects at the front teeth area significantly due to specific thicknesses of upper and lower braces and has a sleepless night during which an anti-snoring device has been installed inside a user's mouth.

Currently, there is another type of anti-snoring device featuring a connecting mechanism installed at the front teeth area and used in forcing the mandible to move forward with upper and lower front teeth pulled toward each other. However, a user who installs this anti-snoring device for a long time will suffer more pains because the front teeth area sustaining excessive strength is pulled intensively. Accordingly, this type of anti-snoring device is not categorized as a device for continuous service.

To solve the above problem, the patent applicant installed a mucosa protection device at an upper teeth brace and a positioning part at a lower teeth brace wherein each of the upper positioning part and the lower positioning part extends a hook part and a prop. When the hook parts of the upper and lower positioning parts are engaged with each other, the mandible stays at a forward position to keep a smooth breathing passage 8 for neither respiratory arrest nor snore. Moreover, the upper and lower positioning parts, both of which do not closely fit but are moveably engaged with each other, form a flexible space for unlimited movement without a user's discomfort at a joint (condyle) of the mandible due to components fastened closely. In summary, a mandible adjustment device in the present disclosure should be considered as a preferred solution.

SUMMARY OF THE INVENTION

The present disclosure relates to a mandible adjustment device comprising: an upper teeth brace, which has an upper teeth accommodation space developed according to a dental pattern and matching a human being's maxillary dental arch and extends a mucosa protection device located at a side wall, being opposite to an upper molar area and having an arc-shaped outer wall surface as well as a through hole thereon; a lower teeth brace, which has a lower teeth accommodation space developed according to a dental pattern and matching a human being's mandible dental arch on a mandible and extends a positioning part located at a side wall, being opposite to a lower molar area and having a prop that stretches toward the mucosa protection device and extends a folding section from a front end to a human being's condyle for development of an angle of bending between the prop and the folding section; wherein: the through hole on the mucosa protection device is greater than the positioning part in diameter and penetrated by the folding section and the prop with the upper teeth brace and the lower teeth brace installed on a user such that (a) the prop stopped by a wall surface of the through hole cannot move backward, (b) the lower teeth brace cannot move downward and a human being's mandible is fixed at a default position correspondingly because the folding section is stopped by a top surface of the mucosa protection device, and (c) the prop which is less than the through hole in size is configured to shift within the through hole, thereby allowing slight movement of the mandible to reduce discomfort at the condyle of a user wearing a mandible adjustment device.

In a preferred embodiment, each of the upper molar area and the lower molar area comprises a first premolar, a second premolar, a first molar and a second molar and each of the mucosa protection device and the positioning part is opposite to each of the first molar and the second molar or one side between the two molars.

In a preferred embodiment, the mucosa protection device and the positioning part is opposite to a peripheral side of the first molar preferably.

In a preferred embodiment, the upper teeth brace (the lower teeth brace) has an opening, which is drilled on the anterior teeth area of the maxillary dental arch (the anterior teeth area of the mandible dental arch), to expose a teeth surface of the anterior teeth area.

In a preferred embodiment, the upper teeth brace (the lower teeth brace) has an occlusion surface that is opposite to the anterior teeth area of the maxillary dental arch (the anterior teeth area of the mandible dental arch) and characteristic of a thickness of less than 1 mm.

In a preferred embodiment, the prop and the folding section on the positioning part form an angle ranging from 30 to 110 degrees or about 90 degrees preferably.

In a preferred embodiment, the prop on the positioning part is characteristic of an adjuster mounted thereon and featuring a thickness with which a position of the mandible during forward positioning is fine-tuned.

In a preferred embodiment, the mucosa protection device comprises a positioning slot, which is opened on a top wall surface near the condyle and characteristic of one end linking the inner wall surface of the through hole as well as the other end with a fastening slot thereon, and the positioning part is equipped with a fastening block at one end of the folding section wherein the positioning slot is combined with the folding section for positioning and the fastening block is fastened inside the fastening slot for stability of the upper teeth brace and lower teeth brace, both of which are engaged with each other.

In a preferred embodiment, the mucosa protection device is characteristic of a top wall surface near the condyle is greater than the folding section in size and the folding section is not exposed to the arc-shaped outer wall surface of the mucosa protection device for no contact between one end of the folding section and oral mucosa.

DETAILED DESCRIPTION OF THE INVENTION

The technical contents, features and effects of a mandible adjustment device are clearly explained in preferred embodiments and accompanying drawings as follows.

Figure 1:
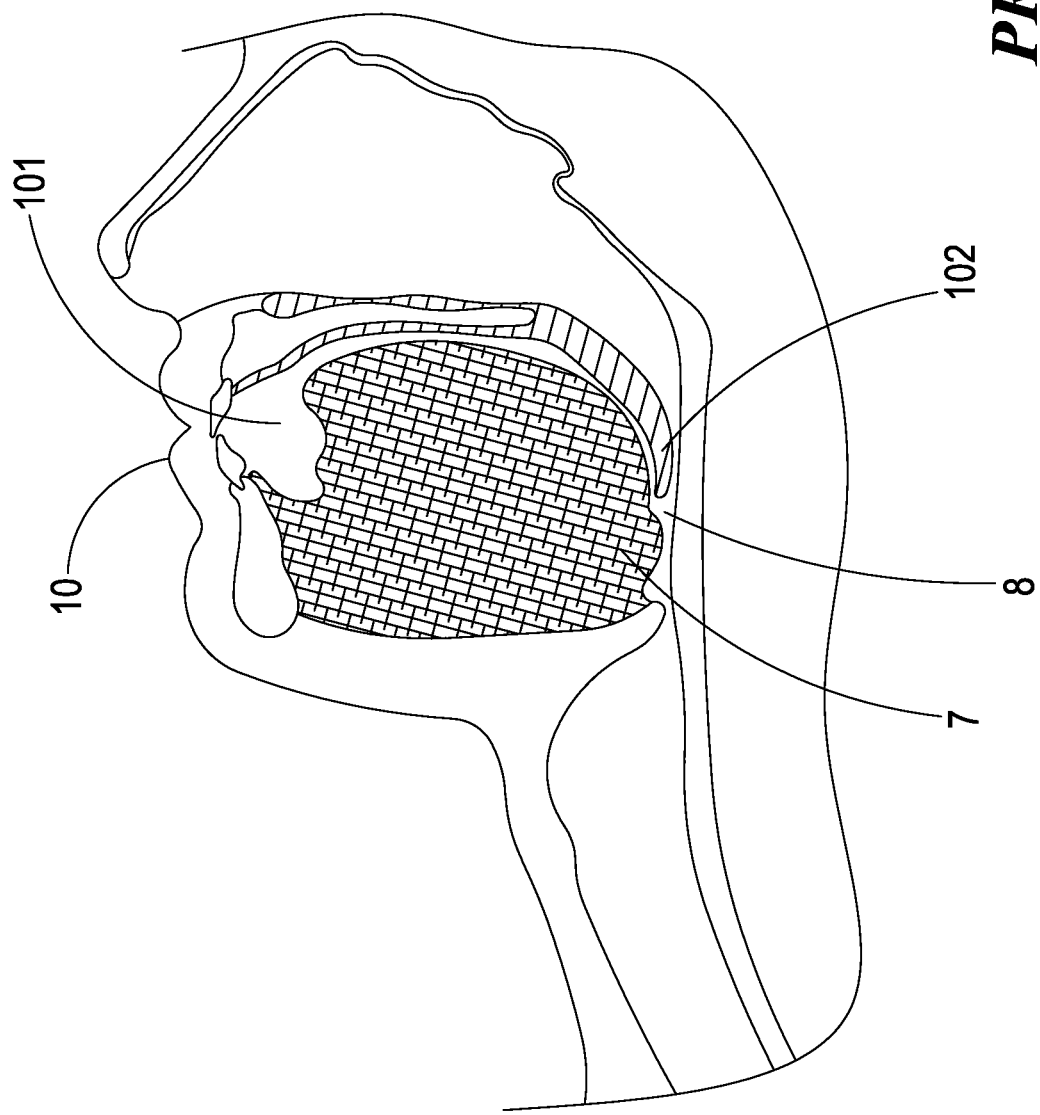
FIG. 1 is a schematic view illustrating squeezed muscles of a human being's breathing passage.
Figure 2:
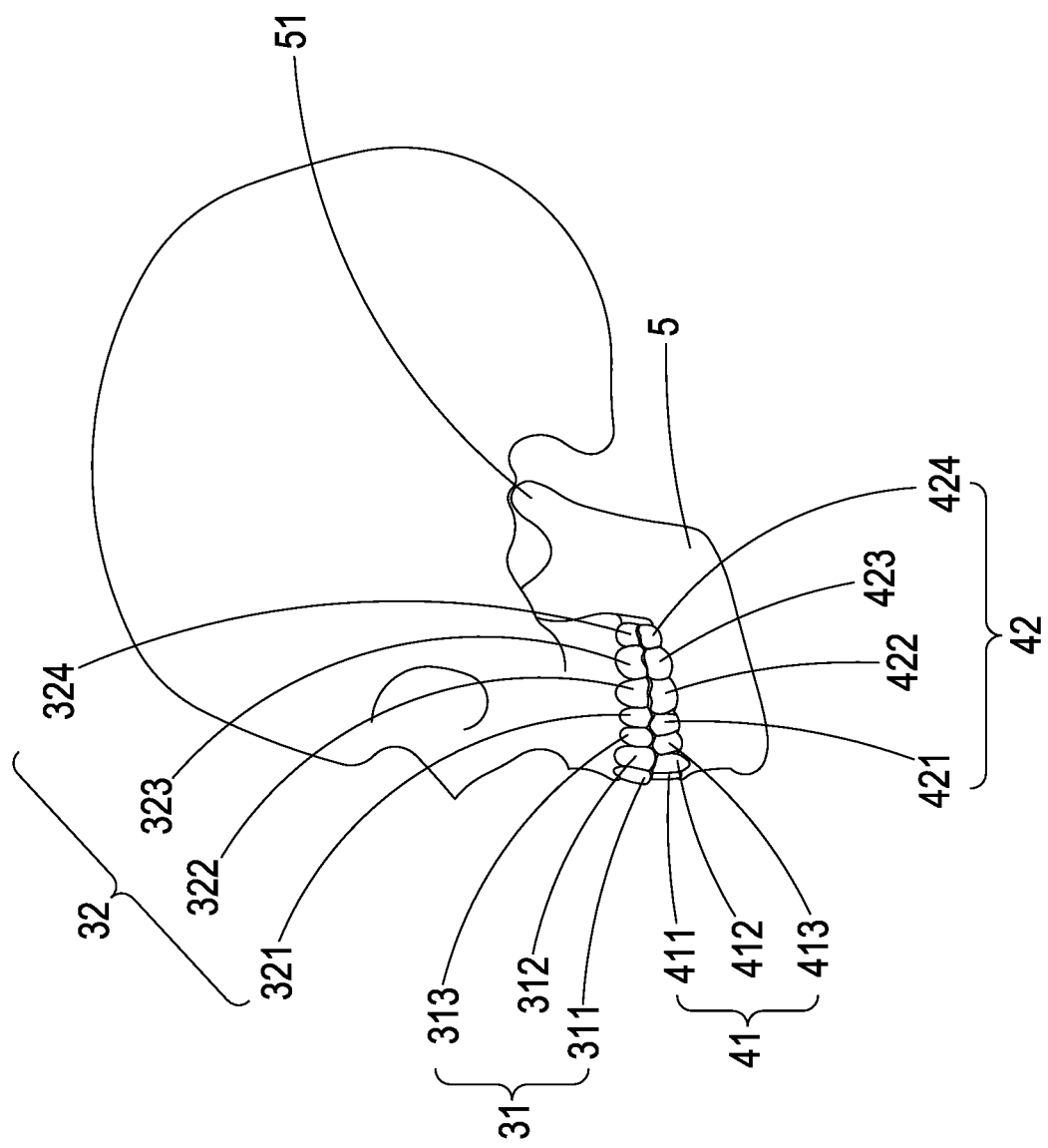
FIG. 2 is a schematic view illustrating dentitions and a mandible at a human being's cranium.
Figure 3A:
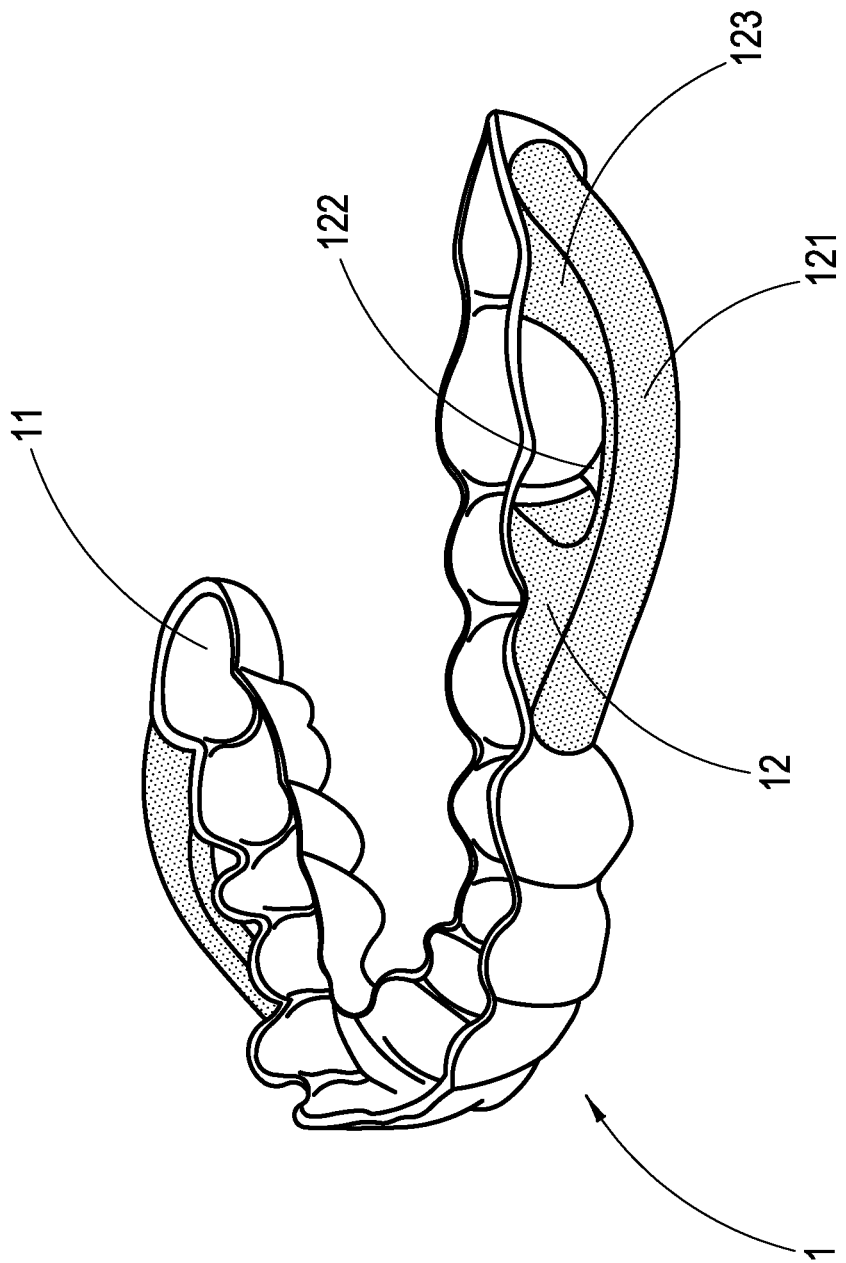
FIG. 3A is a schematic view illustrating a three-dimensional structure of an upper teeth brace in a mandible adjustment device.
Figure 3B:
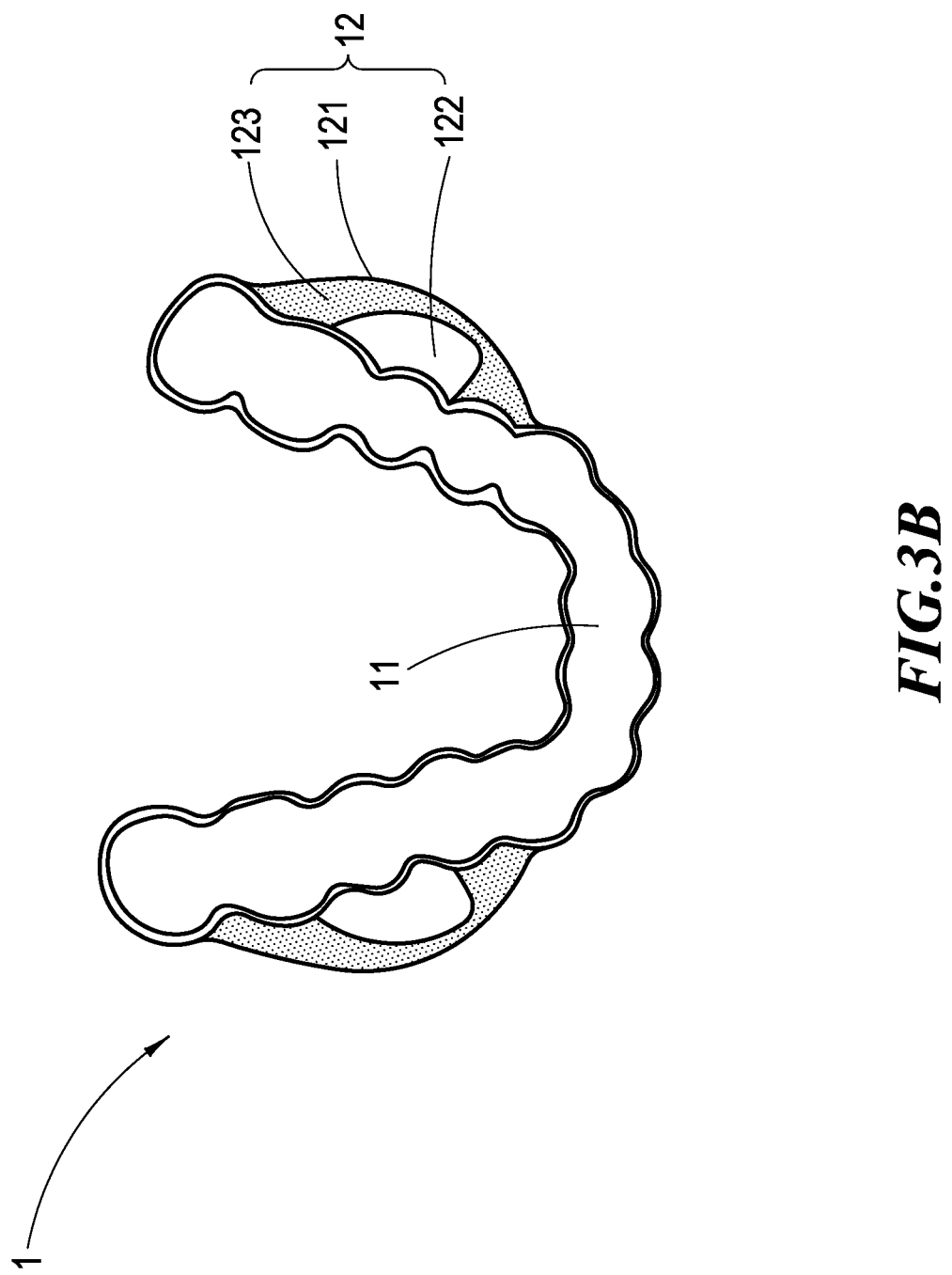
FIG. 3B is a schematic top view of an upper teeth brace in a mandible adjustment device.
Figure 4A:
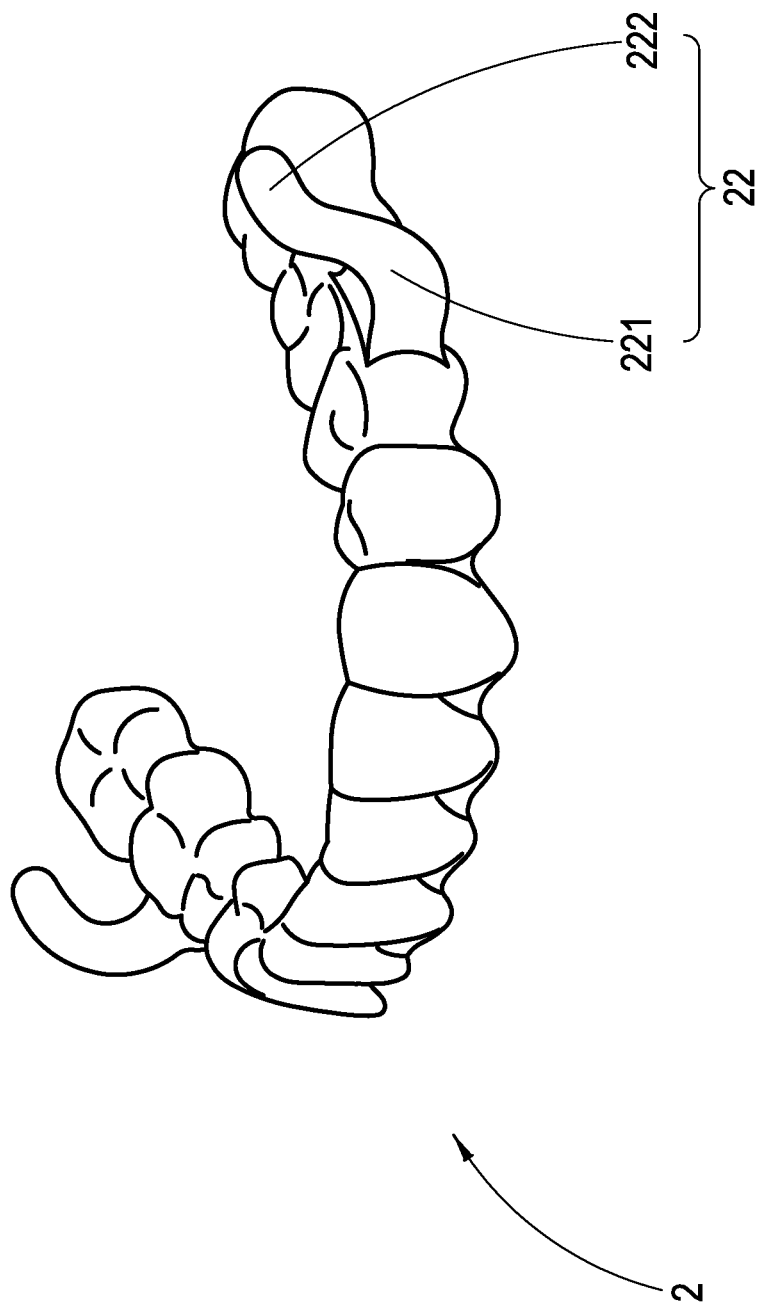
FIG. 4A is a schematic view illustrating a three-dimensional structure of a lower teeth brace in a mandible adjustment device.
Figure 4B:
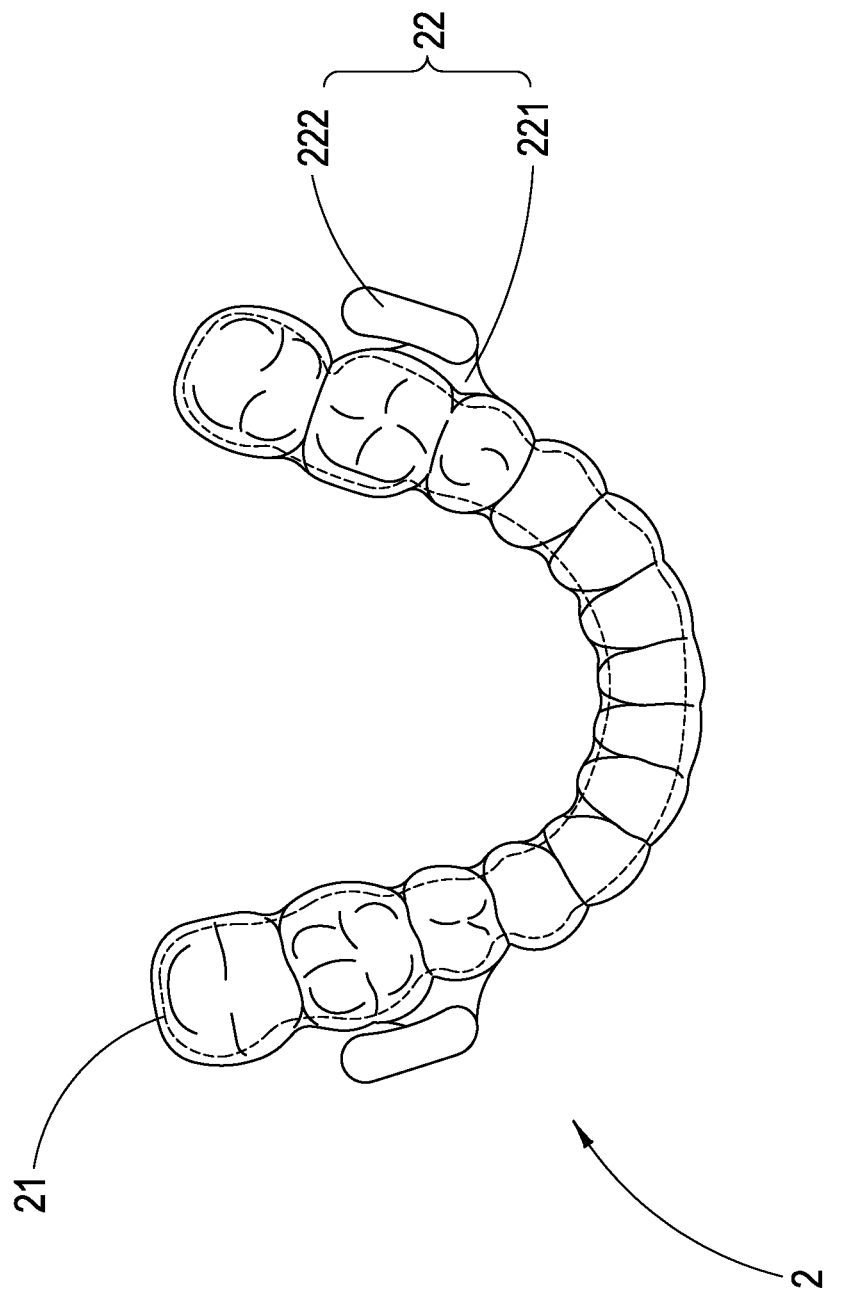
FIG. 4B is a schematic top view of a lower teeth brace in a mandible adjustment device.

As shown in FIG. 2, a human being's oral cavity has a maxillary dental arch as well as a mandible dental arch and dentitions of the maxillary dental arch as well as a mandible dental arch are explained as follows:

1. The dentition of the maxillary dental arch consists of following teeth:
   (a) An anterior teeth area 31 comprising an upper front tooth 311, an upper side front tooth 312 and an upper canine tooth 313;
   (b) An upper molar area 32 comprising a first premolar 321, a second premolar 322, a first molar 323 and a second molar 324 (as well as a third molar).
2. The dentition of the mandible dental arch consists of following teeth:
   (a) An anterior teeth area 41 comprising a lower front tooth 411, a lower side front tooth 412 and a lower canine tooth 413;
   (b) A lower molar area 42 comprising a first premolar 421, a second premolar 422, a first molar 423 and a second molar 424 (as well as a third molar).

As shown in FIGS. 3A, 3B, 4A and 4B, the mandible adjustment device in the present disclosure comprises an upper teeth brace 1 and a lower teeth brace 2. Because the upper teeth brace 1 with an upper teeth accommodation space 11 inside and the lower teeth brace 2 with a lower teeth accommodation space 21 inside are manufactured through a 3D scanning technique for a user's dental pattern, the maxillary dental arch and the mandible dental arch of a human being closely match the upper teeth accommodation space 11 and the lower teeth accommodation space 21, respectively.

The upper teeth brace 1 is provided with a mucosa protection device 12 located at a side wall and opposite to the upper molar area 32; the mucosa protection device 12 which is characteristic of an arc-shaped outer wall surface 121 comprises a through hole 122 opened inside.

The lower teeth brace 2 is provided with a positioning part 22 located at a side wall and opposite to the lower molar area 32; the positioning part 22 forms a prop 221 extending toward the upper molar area 32 and forward extruding a folding section 222 toward a condyle 51 of the mandible 5 crookedly. The prop 221 and the folding section 222 form an angle ranging from 30 to 110 degrees, for example, 30 degrees, 40 degrees, 50 degrees, 60 degrees, 70 degrees, 80 degrees, 90 degrees, 100 degrees and 110 degrees or about 90 degrees preferably: moreover, the positioning part 22 is less than the through hole 122 in diameter such that the through hole 122 is penetrated by each of the prop 221 and the folding section 222 on the positioning part 22.

Figure 5A:
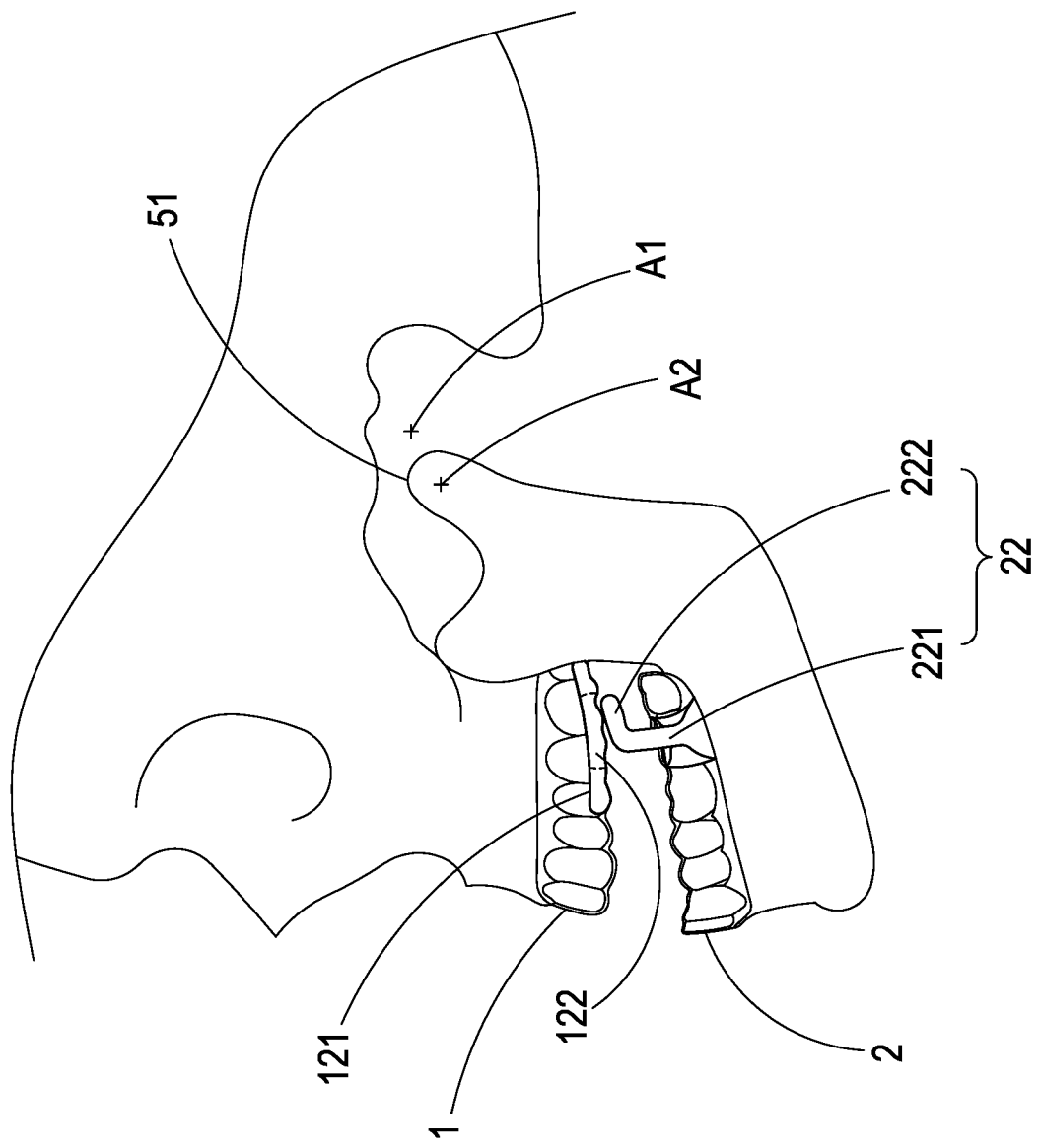
FIG. 5A is a schematic view illustrating displacement of a jawbone after a mandible adjustment device is installed.

As shown in FIG. 5A, a user who is wearing both the upper teeth brace 1 and the lower teeth brace 2 (the condyle 51 of the mandible 5 at an original position A1) should control his (her) mouth muscles to move the mandible 5 downward and then forward and consequentially drive the lower teeth brace 2 forward (from an original position A1 to a first forward position A2).

Figure 5B:
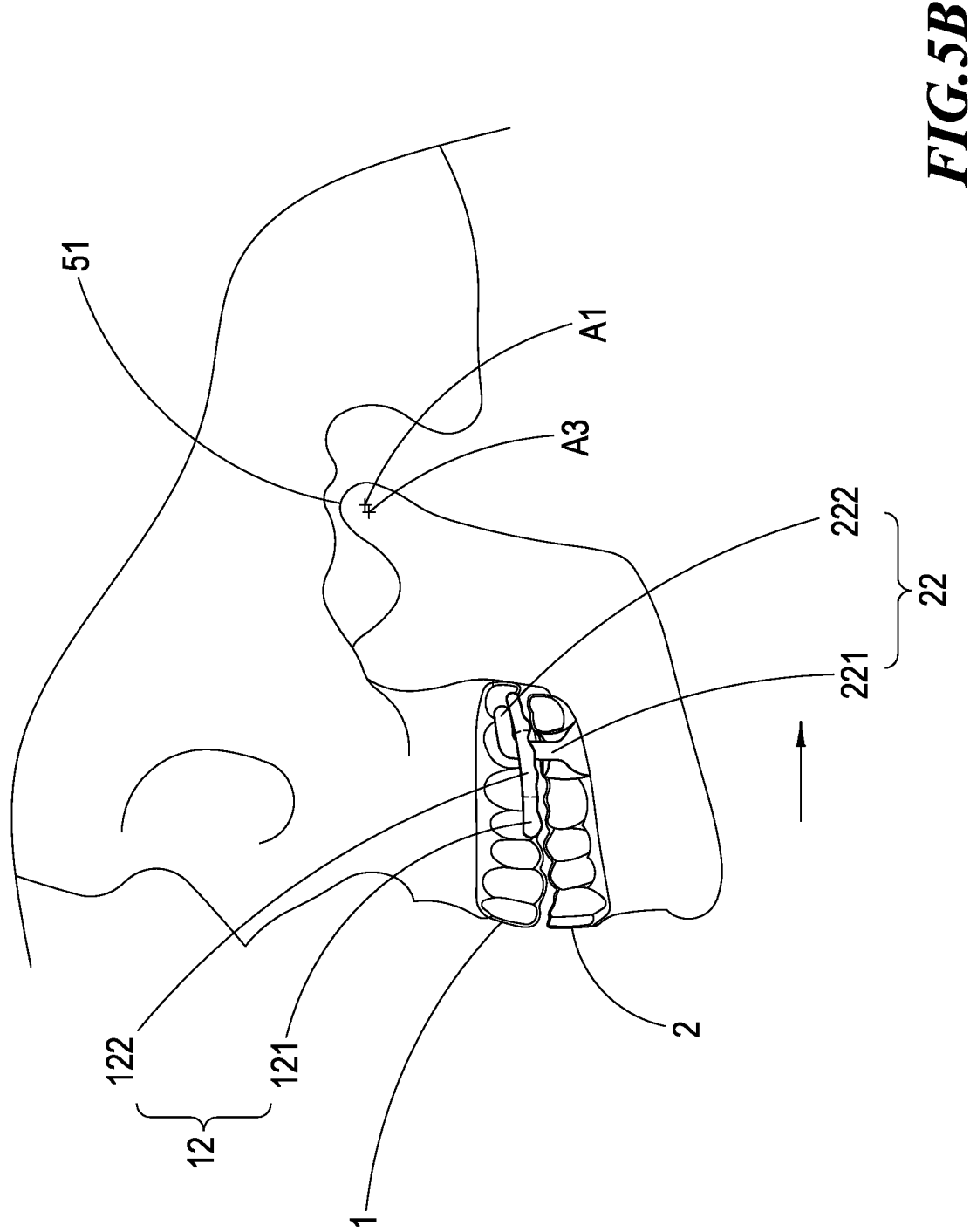
FIG. 5B is another schematic view illustrating displacement of a jawbone after a mandible adjustment device is installed.
Figure 6A:
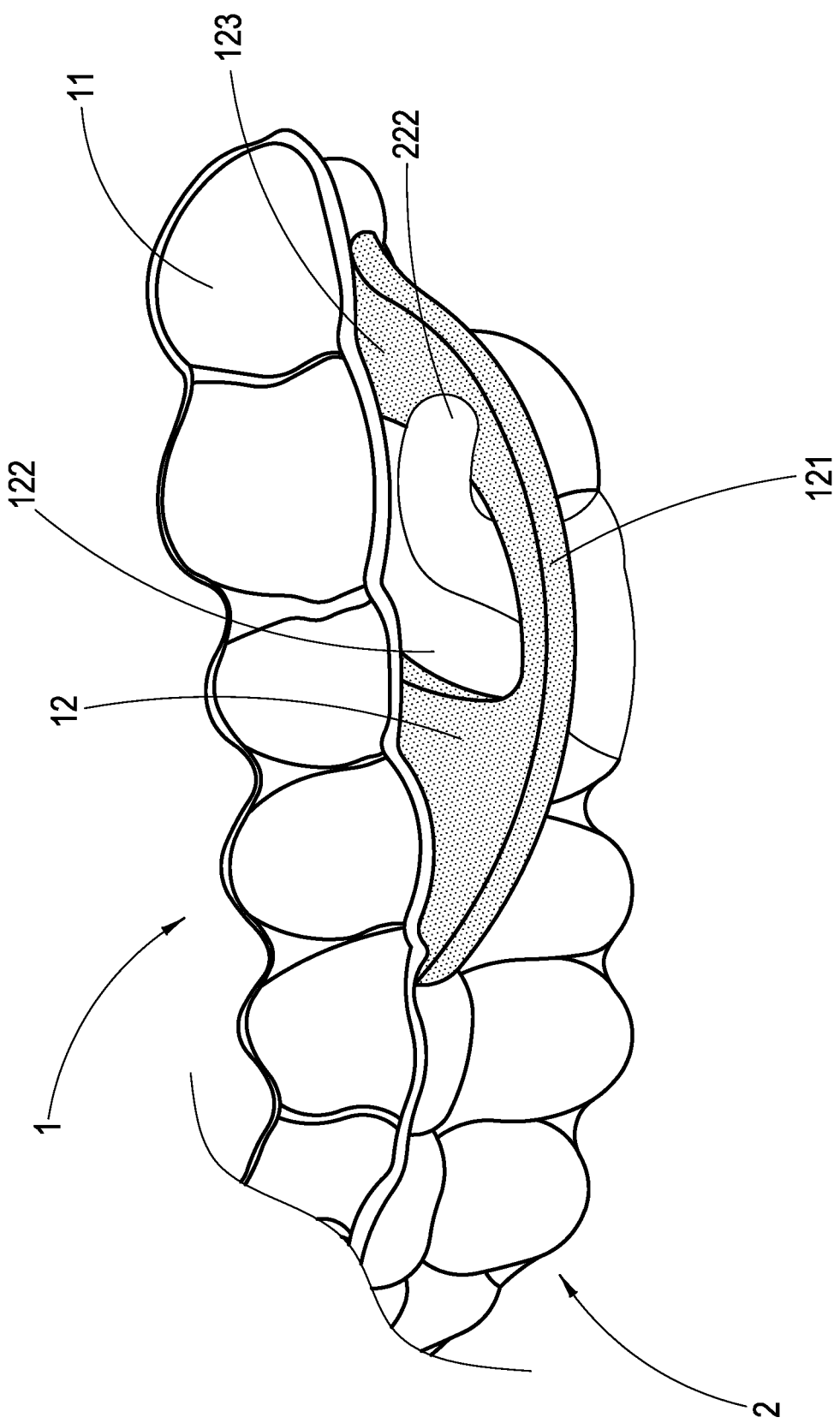
FIG. 6A is a schematic view illustrating both an upper teeth brace and a lower teeth brace of a mandible adjustment device are engaged with each other.

As shown in FIG. 5B for a user closing his (her) mouth, the through hole 122 on the mucosa protection device 12 is penetrated by the prop 221 as well as the folding section 222 and the folding section 222 is positioned at the upper teeth brace 1. Based on movement of muscles, the mandible 5 automatically moves backward through the mandibular retrusion during which the prop 221 stopped by the inner wall surface of the through hole 122 near the condyle 51 is unable to move backward to reach the original position A1 and the folding section 222 shifted to the condyle 51 and stopped by a top wall surface 123 of the mucosa protection device 12 keeps the mandible 5 unmovable in the downward direction and the mouth closed (the condyle 51 is shifted to and positioned at the second forward position A3 as shown in FIG. 6A). In the embodiment, each of the mucosa protection device 12 and the positioning part 22 is opposite to a peripheral side of the first molar. The inner wall surface of the through hole 122 near the condyle 51 is a default position reached by the mandible 5 for forward positioning and designated as a customized forward position physiologically accepted by a specific user. Moreover, the prop 221 which is far less than the through hole 122 in dimension is shifted unlimitedly inside the through hole 122 such that the mandible 5 of a user moves subconsciously without restraint in sleep. Because the top wall surface 123 of the mucosa protection device 12 is greater than the folding section 222 in size, the folding section 222 is not exposed to the arc-shaped outer wall surface 121 of the mucosa protection device 12 for no contact between the top of the folding section 222 and oral mucosa 1011 (as shown in FIG. 6B).

Furthermore, the folding section 222 is stopped by the top wall surface 123 of the mucosa protection device 12 such that the mandible 5 cannot move down and a user's mouth is closed in sleep. Accordingly, the tongue base 7 and the supporting soft palate 102, both of which are shifted upward, keeps the breathing passage 8 unblocked in sleep for neither respiratory arrest nor snore when a sleeper's mouth is not opened by the mandible 5 that is forward positioned and not shifted downward.

Figure 6B:
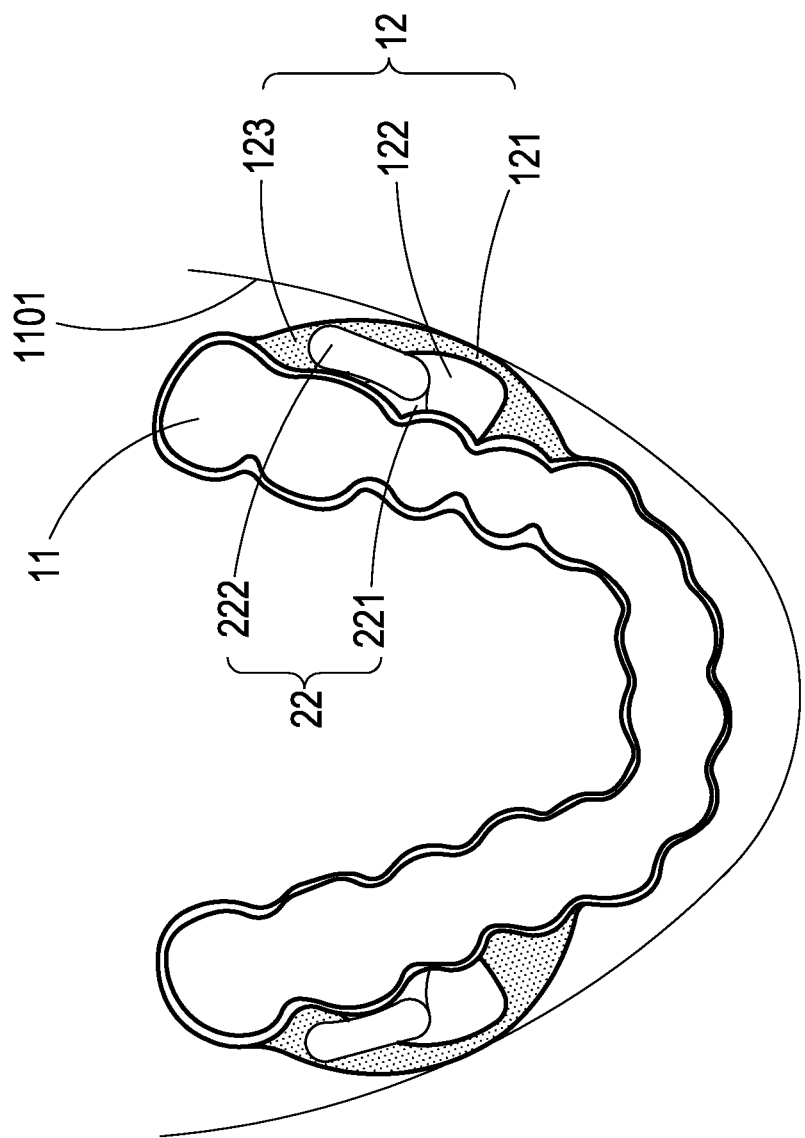
FIG. 6B is a schematic view illustrating both an upper teeth brace and a lower teeth brace of a mandible adjustment device match oral mucosa.
Figure 7:
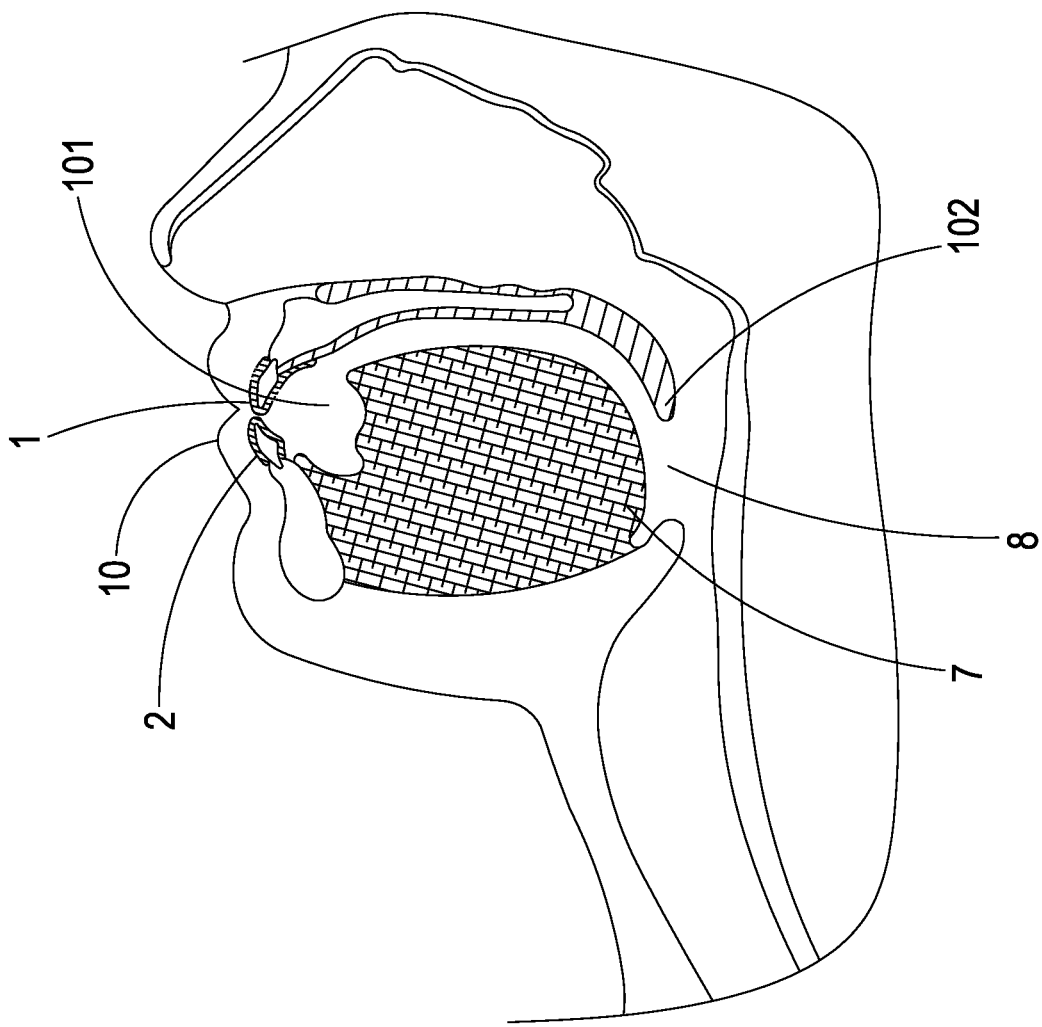
FIG. 7 is a schematic view illustrating status of a breathing passage after a mandible adjustment device is installed.

Additionally, as shown in FIG. 6B, the arc-shaped outer wall surface 121 with a proper angle of bending closely fits the oral mucosa 1011 and scratches no mucosa when the mandible 5 is shifted slightly: moreover, a user who wears a mandible adjustment device for a long time feels comfortable with the oral mucosa 1011 on which pressures are dispersed by the arc-shaped outer wall surface 121 evenly rather than on a single point.

Figure 8A:
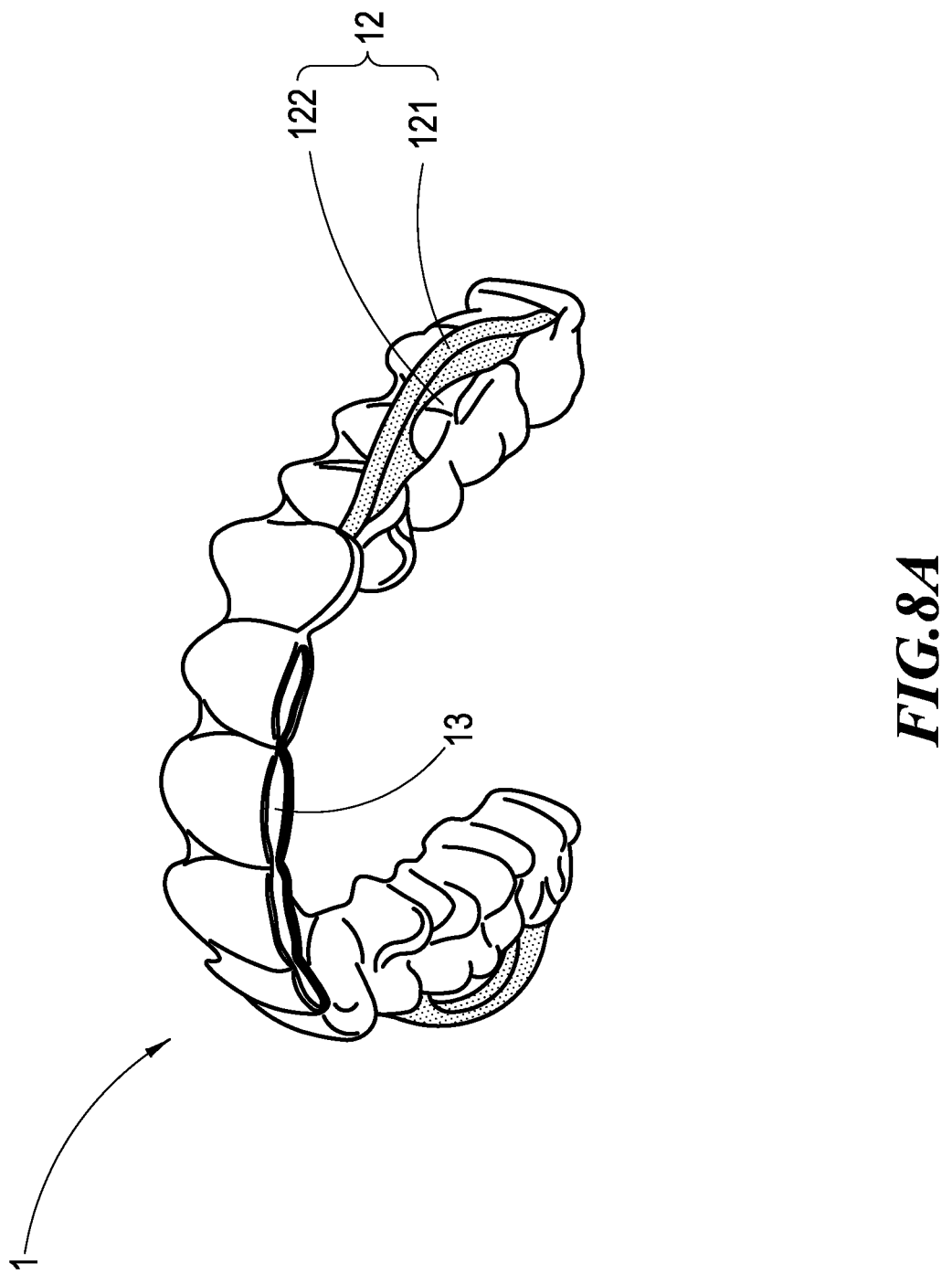
FIG. 8A is a schematic view illustrating openings on an upper teeth brace of a mandible adjustment device.
Figure 8B:
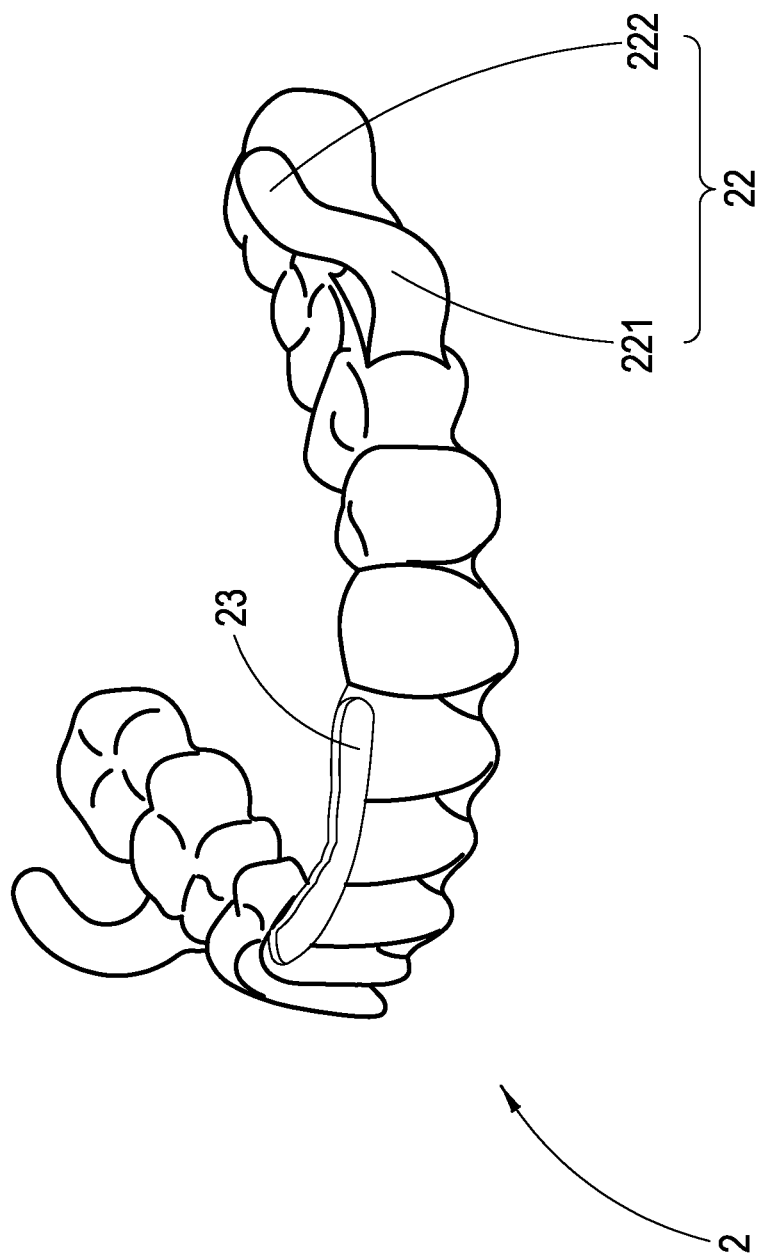
FIG. 8B is a schematic view illustrating openings on a lower teeth brace of a mandible adjustment device.
Figure 9:
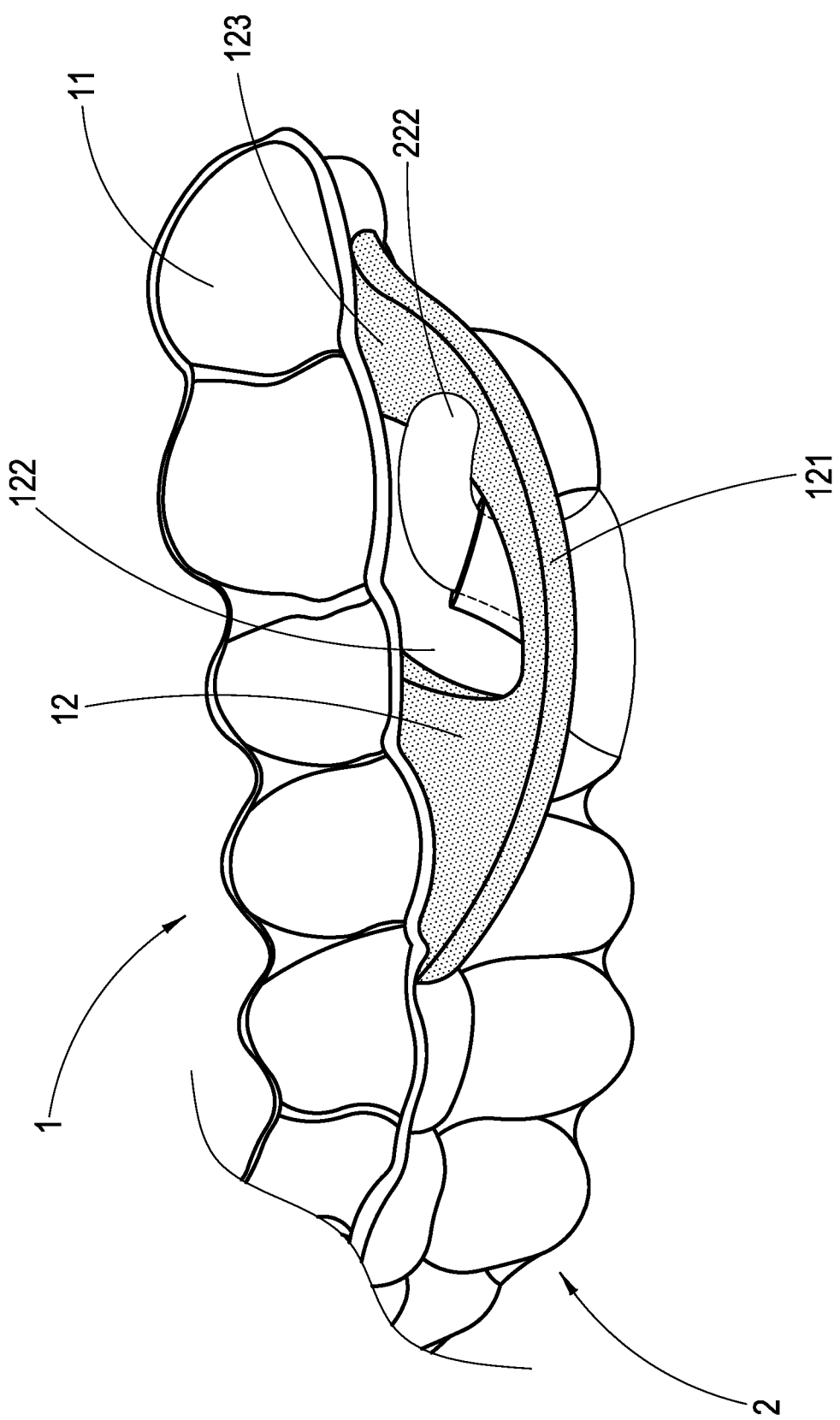
FIG. 9 is a schematic view illustrating an adjuster is mounted on a mandible adjustment device.

As shown in FIGS. 8A and 8B, the teeth surfaces of the anterior teeth areas 31,41 are exposed due to the upper teeth brace 1 and the lower teeth brace 2, which have an opening 13 and an opening 23 opposite to the anterior teeth area 31 of the maxillary dental arch 3 and the anterior teeth area 41 of the mandible dental arch 4 in a human body, respectively. When a user's mandible 5 is shifted forward, the teeth surfaces of the anterior teeth areas 31,41 contact with each other and a user feels comfortable with the condyle 51 of the mandible 5 which is not kept at a downward position due to larger thicknesses of the upper teeth brace 1 and/or the lower teeth brace 2.

Furthermore, for no discomfort of a user occluding teeth due to thicknesses of the upper teeth brace 1 and/or the lower teeth brace 2, the thickness in each of occlusion surfaces of the upper teeth brace 1 and the lower teeth brace 2, which are opposite to the anterior teeth areas of the maxillary dental arch and the mandible dental arch, respectively, is designed as less than 1 mm. Accordingly, teeth occlusion of the anterior teeth areas is analogous to the past occlusion habit of a user on whom no mandible adjustment device was installed for a user's minimum discomfort.

Referring to FIGS. 7, 9 and 10A-10C in which an adjuster 6 (FIG. 9) is installed on the prop 221 as required due to the mandible 5 at a forward position that causes a breathing passage blocked in sleep. In virtue of a thickness of the adjuster 6, the mandible 5 is forward positioned controllably. Moreover, the prop 221 on which the adjuster 6 has been installed is characteristic of the overall size still less than the through hole 122 and shifted inside the through hole unlimitedly.

Figure 10C:
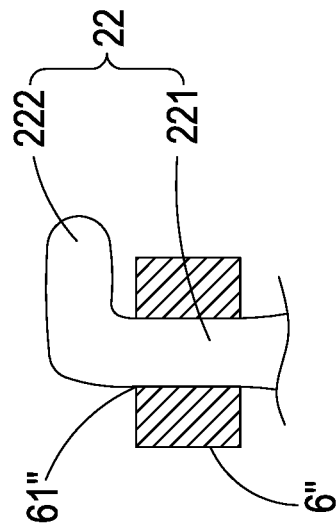
FIGS. 10A-10C are schematic views illustrating an adjuster is mounted on a mandible adjustment device.
Figure 10B:
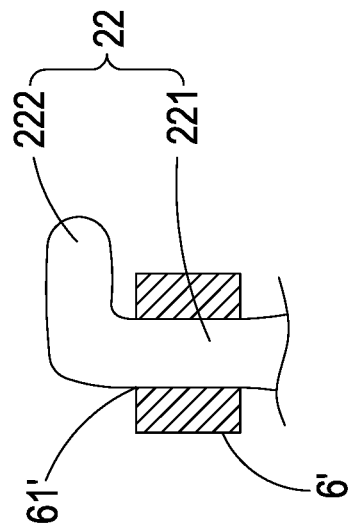
Figure 10A:
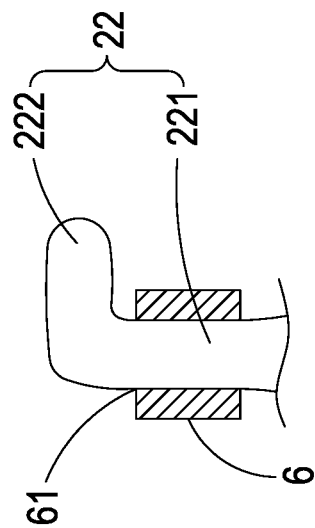

As shown in FIGS. 10A-10C, the adjusters 6, 6' and 6", which are elastic components with holes 61, 61' and 61", respectively; the adjusters 6, 6' and 6", which are mounted on the prop 221 through the holes 61, 61' and 61", respectively, are characteristic of distinct thicknesses for a user's choice as required and fine-tuning of the mandible 5 forward positioned flexibly. For the mandible 5 at a forward position accepted by a user, the breathing passage 8 is kept unblocked for neither respiratory arrest nor snore.

Figure 11:
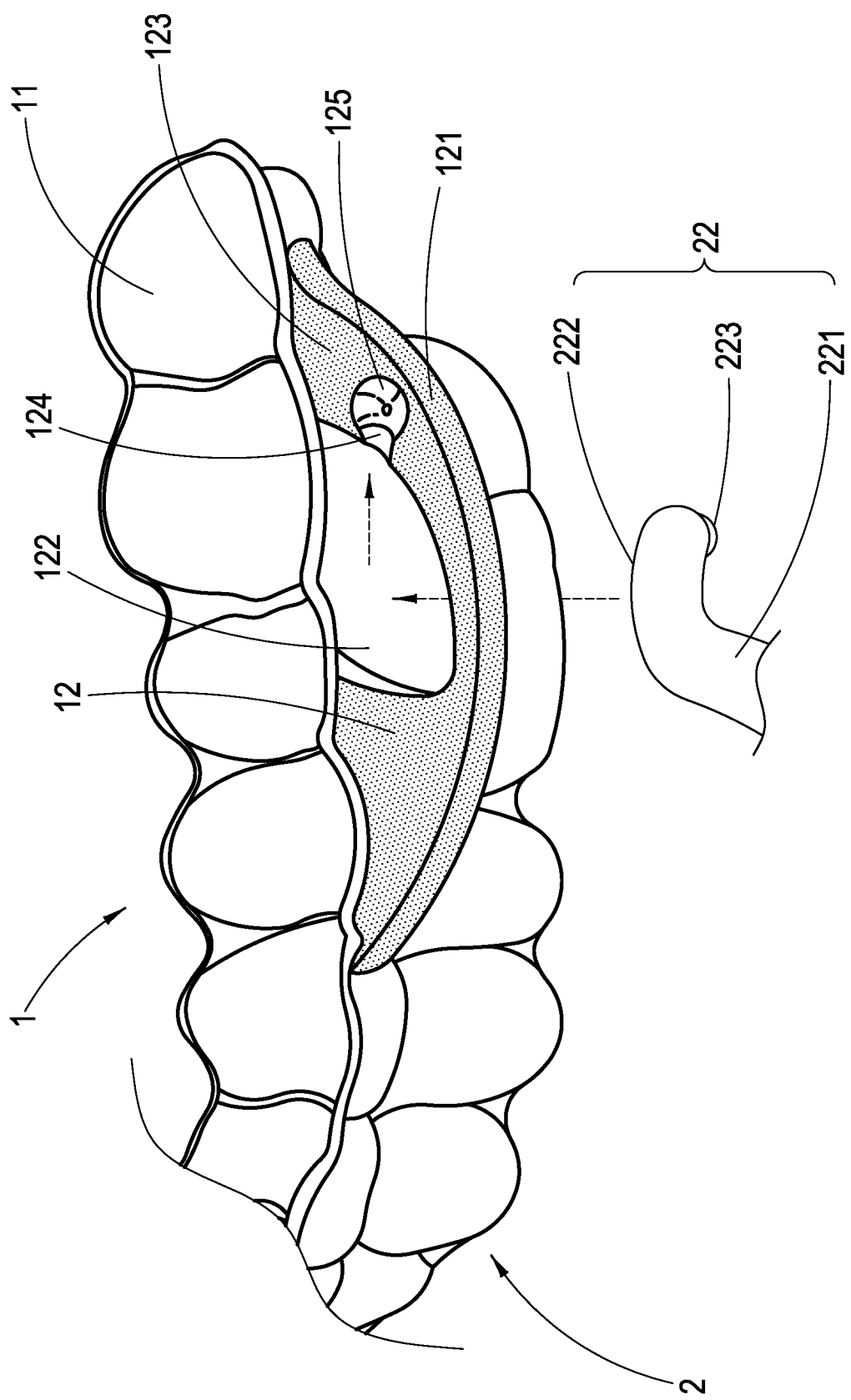
FIG. 11 is a schematic view illustrating a mucosa protection device of a mandible adjustment device in another embodiment.

Furthermore, referring to FIG. 11 in which a positioning slot 124 different from the previous embodiments is designed on the top wall surface 123 of the mucosa protection device 12 near the condyle 51 and has one end linking the inner wall surface of the through hole 122 as well as the other end with a fastening slot 125 opened thereon: moreover, a fastening block 223 is mounted at one end of the folding section 222 on the positioning part 22. The positioning slot 124 is combined with the folding section 222 for positioning and the fastening block 223 is fastened inside the fastening slot 125 for stability of the upper teeth brace 1 and lower teeth brace 2, both of which are engaged with each other. In the embodiment, other structural features identical to those of previous embodiments are not explained repeatedly.

The advantages of a mandible adjustment device in the present disclosure in contrast to the prior art are shown as follows:
  (1) A user might feel strong discomfort at the condyle 51 of the mandible 5 which is fixed for a long time compared with a mandible 5 moving normally in sleep. In the present disclosure, the positioning part 22 which is less than the through hole 12 on the mucosa protection device 12 in size is shifted inside the through hole 122 unlimitedly. Accordingly, a user who has worn a mandible adjustment device for a long time in sleep feels no discomfort at the condyle 51 because the mandible 5 moves without restraint.
  (2) The breathing passage 8 of a sleeper is kept unblocked for neither respiratory arrest nor snore due to the tongue base 7 and the supporting soft palate 102, both of which are pulled upward when the mandible 5 is shifted and positioned forward.

In the present disclosure, a user feels no discomfort at the oral mucosa 1011 when pressure applied on the oral mucosa 1011 by the mucosa protection device 12 with an arc-shaped outer wall surface 121 thereon is dispersed evenly rather than at a single point.

A mandible adjustment device has been disclosed in preferred embodiments which are not taken as examples to restrict the scope of the present application. Any change and/or modification made by the skilled persons who have general knowledge in the art and familiarize themselves with the above technical features and embodiments without departing from the spirit and scope of the present disclosure should be covered in claims of the patent specification.

The invention claimed is:
1. A mandible adjustment device, comprising:
  an upper teeth brace, which has an upper teeth accommodation space developed according to a dental pattern and configured to match a human being's maxillary dental arch, and a mucosa protection device extending laterally outward from a side wall of the upper teeth brace, configured to be opposite to an upper molar area and having an arc-shaped outer wall surface as well as a through hole thereon; and
  a lower teeth brace, which has a lower teeth accommodation space developed according to a dental pattern and configured to match the human being's mandible dental arch on a mandible with a positioning part located at a side wall of the lower teeth brace, configured to be opposite to a lower molar area and having a prop that stretches toward the mucosa protection device and a folding section configured to extend from a front end to the human being's condyle, wherein the folding section extends perpendicularly from the prop such that a rearmost tip of the folding section rests on a top surface of the mucosa protection device when the prop extends vertically through the through hole;

wherein the through hole on the mucosa protection device is greater than the positioning part in diameter and penetrated by the folding section and the prop with the upper teeth brace and the lower teeth brace being configured to be installed on the human being such that the prop stopped by a wall surface of the through hole cannot move backward; the lower teeth brace cannot move downward and the human being's mandible is configured to be fixed at a default position correspondingly because the folding section is stopped by the top surface of the mucosa protection device; and the prop which is smaller than the through hole in size is configured to shift within the through hole, thereby allowing slight movement of the mandible to reduce discomfort at the condyle of the human being wearing the mandible adjustment device.

2. The mandible adjustment device as claimed in claim 1 wherein the mucosa protection device and the positioning part are configured to be opposite to a peripheral side of a first molar.

3. The mandible adjustment device as claimed in claim 1 wherein the upper teeth brace or/and the lower teeth brace has an opening, which is configured to be worn on an anterior teeth area of the maxillary dental arch or/and an anterior teeth area of the mandible dental arch, to expose a teeth surface of the respective anterior teeth area.

4. The mandible adjustment device as claimed in claim 1 wherein the upper teeth brace and the lower teeth brace have an occlusion surface that is correspondingly configured to be opposite to an anterior teeth area of the maxillary dental arch and an anterior teeth area of the mandible dental arch and characteristic of a thickness of less than 1 mm.

5. The mandible adjustment device as claimed in claim 1 wherein the top surface configured to be near the condyle is greater than the folding section in size and the folding section is not exposed to the arc-shaped outer wall surface of the mucosa protection device to prevent contact between one end of the folding section and oral mucosa.

6. A mandible adjustment device, comprising:

an upper teeth brace, which has an upper teeth accommodation space developed according to a dental pattern and configured to match a human being's maxillary dental arch, and a mucosa protection device located at a side wall of the upper teeth brace, configured to be opposite to an upper molar area and having an arc-shaped outer wall surface as well as a through hole thereon; and a lower teeth brace, which has a lower teeth accommodation space developed according to a dental pattern and configured to match the human being's mandible dental arch on a mandible with a positioning part located at a side wall of the lower teeth brace, configured to be opposite to a lower molar area and having a prop that stretches toward the mucosa protection device and a folding section configured to extend from a front end to the human being's condyle, the positioning part comprising an angle of bending between the prop and the folding section;

wherein the through hole on the mucosa protection device is greater than the positioning part in diameter and penetrated by the folding section and the prop with the upper teeth brace and the lower teeth brace being configured to be installed on the human such that the prop stopped by a wall surface of the through hole cannot move backward; the lower teeth brace cannot move downward and the human being's mandible is configured to be fixed at a default position correspondingly because the folding section is stopped by a top surface of the mucosa protection device; and the prop which is smaller than the through hole in size is configured to shift within the through hole, thereby allowing slight movement of the mandible to reduce discomfort at the condyle of the human being wearing the mandible adjustment device;

wherein the mucosa protection device comprises a positioning slot, which is configured to be opened on the top surface near the condyle and comprising one end linking the wall surface of the through hole with a fastening slot on another end, and the positioning part is equipped with a fastening block at one end of the folding section such that the positioning slot is combined with the folding section for positioning and the fastening block is fastened inside the fastening slot for stability of the upper teeth brace and lower teeth brace, both of which are engaged with each other.

* * * * *